United States Patent
Binnebesel

(10) Patent No.: US 8,485,468 B2
(45) Date of Patent: Jul. 16, 2013

(54) GROUND-BASED APPARATUS FOR THE TAKE-OFF, LANDING AND TAXIING OF AIRCRAFT

(76) Inventor: Jan Binnebesel, Hamburg (DE)

( * ) Notice: Subject to any disclaimer, the term of this patent is extended or adjusted under 35 U.S.C. 154(b) by 201 days.

(21) Appl. No.: 12/991,401

(22) PCT Filed: Apr. 30, 2009

(86) PCT No.: PCT/DE2009/000616
§ 371 (c)(1),
(2), (4) Date: Jan. 27, 2011

(87) PCT Pub. No.: WO2009/135472
PCT Pub. Date: Nov. 12, 2009

(65) Prior Publication Data
US 2011/0204180 A1    Aug. 25, 2011

(30) Foreign Application Priority Data

May 9, 2008  (DE) .......................... 10 2008 023 698

(51) Int. Cl.
*B64F 1/04*  (2006.01)
(52) U.S. Cl.
USPC .......... 244/63; 244/114 R; 244/115; 244/116; 244/110 E
(58) Field of Classification Search
USPC ................. 244/63, 114 R, 115, 116, 110 E, 244/110 F, 110 G
See application file for complete search history.

(56) References Cited

U.S. PATENT DOCUMENTS

| | | | |
|---|---|---|---|
| 2,246,716 A | | 6/1941 | Bottrill |
| 3,068,612 A | * | 12/1962 | Simpson .......... 446/65 |
| 3,128,066 A | | 4/1964 | Bailey |
| 3,380,690 A | | 4/1968 | Rego |
| 3,567,159 A | | 3/1971 | Klein |
| 3,905,350 A | * | 9/1975 | Becker ............ 124/17 |
| 4,060,930 A | * | 12/1977 | Hirtle et al. ........ 446/65 |
| 4,079,901 A | * | 3/1978 | Mayhew et al. ...... 244/63 |
| 4,238,093 A | * | 12/1980 | Siegel et al. ........ 244/63 |
| 4,909,458 A | * | 3/1990 | Martin ............. 244/63 |
| 5,143,323 A | * | 9/1992 | Husain et al. ...... 244/116 |
| 5,150,860 A | * | 9/1992 | Young ............. 244/63 |
| 5,170,966 A | * | 12/1992 | Sheu ............ 244/110 E |
| 5,695,153 A | * | 12/1997 | Britton et al. ...... 244/63 |

(Continued)

FOREIGN PATENT DOCUMENTS

| | | | |
|---|---|---|---|
| DE | 3034014 | A1 | 1/1982 |
| DE | 4102271 | * | 7/1992 |

(Continued)

*Primary Examiner* — Tien Dinh
*Assistant Examiner* — Assres H Woldemaryam
(74) *Attorney, Agent, or Firm* — Vidas, Arrett & Steinkraus P.A.

(57) ABSTRACT

An apparatus for the take-off, landing and taxiing of an aircraft without undercarriage system or with retracted undercarriage, wherein the apparatus comprises a ground-based undercarriage, the speed of which can be matched to the speed of the aircraft when landing, the ground-based undercarriage (10) is releasably connected to a slide system, which can be driven in a direction of movement, the ground-based undercarriage (10) has at least two coupling means, which enable interfaces of the aircraft (4) on the ground-based undercarriage (10) to be coupled, the ground-based undercarriage (10) can be moved along the slide system transversally to the direction of movement of the slide system to match the ground-based undercarriage (10) to the position of the aircraft (4).

20 Claims, 3 Drawing Sheets

U.S. PATENT DOCUMENTS

| | | |
|---|---|---|
| 6,394,391 B1 | 5/2002 | Lo |
| 7,210,654 B1 * | 5/2007 | Cox et al. ............... 244/63 |
| 7,226,018 B2 * | 6/2007 | Sullivan ................. 244/111 |
| 7,594,624 B2 * | 9/2009 | Yamamoto ............... 244/63 |
| 8,123,163 B2 * | 2/2012 | McCoskey et al. ...... 244/110 A |

FOREIGN PATENT DOCUMENTS

| | | |
|---|---|---|
| DE | 4102271 A1 * | 7/1992 |
| DE | 19950674 A1 | 10/1999 |
| WO | 2009/135472 A2 | 4/2009 |

* cited by examiner

GROUND-BASED APPARATUS FOR THE TAKE-OFF, LANDING AND TAXIING OF AIRCRAFT

CROSS-REFERENCE TO RELATED APPLICATIONS

This application is a National Stage entry from PCT/DE2009/000616, filed on Apr. 30, 2009, claiming priority to DE 10 2008 023 698.5, filed on May 9, 2008, the contents of which is hereby incorporated by reference.

STATEMENT REGARDING FEDERALLY SPONSORED RESEARCH

Not applicable.

BACKGROUND OF THE INVENTION

The present invention relates to a ground-based apparatus for the take-off, landing and taxiing of aircraft without undercarriage system or with retracted undercarriage which is additionally installed on a runway.

The empty mass of an aircraft has a major influence on its economy. A lower empty mass ensures a better economy for the same maximum take-off weight or for constant payload, as either greater payload can be transported or the air drag and therefore the fuel consumption is reduced due to the reduction in gross mass. With conventional aircraft, the undercarriage takes up a relative portion of about 6% to 10% of the empty mass depending on the aircraft type and has no function during the cruise flight. It is used on the ground for take-off, landing and taxiing. Furthermore, the undercarriage system is very cost intensive, both in manufacture and in operation. Omitting the undercarriage system would result in a reduction in the empty mass and in economic, ecological and operational advantages for the aircraft operator in regular flight operations.

To make use of these advantages, a ground-based apparatus which enables aircraft without an undercarriage to take off, land and taxi must be installed at airports.

There have been a large number of aircraft types in the history of air travel which were not fitted with an undercarriage. Technologies that have already been used and publications in connection with aircraft without an undercarriage that have not previously been implemented are highlighted below.

Basically, the solutions which have been found can be divided into two groups: solutions installed in the aircraft and solutions installed on the ground.

The first aircraft-based solutions were realized in the Second World War. The Messerschmitt Me 163 "Komet", which was built from 1941, was a fighter-interceptor with a rocket propulsion and took off optionally on a jettisonable two-wheeled undercarriage or a ramp. Landing took place on a skid installed on the aircraft. 80% of about 370 aircraft built crashed due to landing errors.

The Arado Ar 234 "Blitz" was built from 1943 onwards. The first version was built without an undercarriage. Version A-0 of the "Blitz" was fitted with a fixed landing skid and a releasable three-wheeled take-off trolley. Take-off and landing were so impractical however that subsequent versions were fitted with an undercarriage installed on the aircraft.

The ground operations to transport these aircraft from the runway after landing, to move them onto the take-off trolley again and to retrieve the take-off trolley after every take-off were very laborious. This fact alone would make the normal operations of modern aircraft on the ground highly complicated. Furthermore, there was only limited tracking stability and no possibility of regulating the braking force when landing with a skid. The deceleration depends on the friction between the skid material and that of the airfield.

Runway-installed solutions for landing aircraft without an undercarriage were investigated by the Royal Navy from 1947 to 1955. Three prototypes of the De Havilland F21 "Sea Vampire" were modified to carry out landings with retracted undercarriage on a flexible rubber deck. Here, the runway absorbed the landing impact and the braking force resulted from the friction between the underside of the aircraft and the runway covering. After landing, the "Sea Vampire" had to be removed from the runway and placed on a ramp for take-off After numerous test runs on land, the flexible runway was installed on the aircraft carrier "HMS Warrior". In this case, deceleration occurred in a controlled manner by means of the tail hook catching system which is in common use on aircraft carriers.

This system is not suitable for use with present-day aircraft, in particular commercial aircraft, on account of the laborious operations on the ground, the lack of tracking stability and the extensive modification of the whole runway.

As well as the systems already implemented, there are different publications which concern themselves with approaches to solutions for landing aircraft that are designed without an undercarriage for the purpose of reducing mass.

In a publication from 1968, the inventor José Domínguez Rego describes a so-called "Aircraft Landing System" (U.S. Pat. No. 3,380,690), with which the aircraft without an undercarriage lands on a runway equipped with rollers and is transferred to a rail-guided slide at the end of the runway. The axis of rotation of the rollers is arranged at right angles to the runway. To enable aircraft to land on the underside of the fuselage, this would have to be considerably strengthened which would lead to a significant increase in mass. This puts the mass reduction due to omitting the undercarriage system into perspective. Furthermore, the whole runway would have to be fitted with rollers, each of which would have to be designed to be individually damped and braked and would therefore have a high level of system complexity. H.-J. Müller and G. Plankermann offer a further proposed solution in the 2002 publication "Vorrichtung in Form einer bodengebundenen Fahrwerksanordnung zum Starten and Landen von Flugzeugen" (Ground-bound landing gear arrangement for aircraft take-off and landing) (DE 4102271). Here, the use of a conventional runway is entirely dispensed with and a carriage on a magnetic track is used instead. However, this requires the landing maneuver to be accurately positioned. A translatory degree of freedom at right angles to the landing direction to take into account a lateral offset of the aircraft shortly before touching down is completely absent. The lateral offset can come about due to disturbances such as gusts of wind for example, and cannot be ruled out even with the use of automatic landing systems. Furthermore, it is not possible for the apparatus to be jointly used also by conventional aircraft with undercarriage, and the raised course of the magnetic track constitutes a high risk potential.

An "Anordnung mit einer Einrichtung zur Landung von Flugzeugen" (Arrangement having a device for landing aircraft) (DE 19950674) was conceived in 2003 by M. Günther for the emergency landing of aircraft with defective undercarriage and also for routine landings of aircraft without undercarriage, in which a landing platform accelerates along the runway until it is synchronized with the approaching aircraft. The device is laterally guided by rails and is fitted with a catch net and wheels fixed underneath the landing platform.

Because of its large size, the mass of this system will presumably be high and the aircraft will have to be lifted and transported from the landing platform after landing. Furthermore, here too, the underside of the aircraft's fuselage would have to be strengthened to achieve a damage-free landing. It is questionable whether economic operation can be made possible under these boundary conditions for the use of aircraft, particularly in the civil commercial aircraft sector.

In general, it can be said that the solutions presented and similar solutions described in other publications (for example U.S. Pat. No. 3,567,159, U.S. Pat. No. 3,128,066, U.S. Pat. No. 2,246,716, U.S. Pat. No. 6,394,391 B1, DE 3034014) are not suitable for regular flight operations including the landing of aircraft, in particular commercial aircraft, usually not for operational reasons, in particular due to the sometimes considerably complicated ground operations, or because of the necessary extensive modifications to the aircraft, for example to the underside of the fuselage, and the associated higher structural mass.

BRIEF SUMMARY OF THE INVENTION

The present invention creates a ground-based apparatus which is also suitable for regular flight operations including the take-off, landing and taxiing of an aircraft, in particular of a commercial aircraft without undercarriage system or with retracted undercarriage, and which if possible enables the existing operational processes, the pilot's procedures and the air traffic control procedures to be retained.

The apparatus is used on a conventional runway and has two translatory (along the runway and at right angles to the runway) and one rotational degree of freedom about the vertical axis. Use on an aircraft carrier is also conceivable. The use of the ground-based apparatus described here requires a minor modification to conventional aircraft. Interfaces must be installed on the aircraft into which the ground-based apparatus can be coupled. These interfaces can be installed in addition to the conventional undercarriage. However, a replacement of the existing undercarriage system by the interfaces is aimed for. In doing so, the interfaces are incorporated at the points on the aircraft where the load of the landing impact is absorbed in the case of conventional undercarriage systems. At these points the structure is designed to absorb the forces that occur. An alternative in the case of new aircraft developments is to position the interfaces at unconventional points, such as for example at a greater distance than is previously common behind the centre of gravity and at a smaller distance in front of the centre of gravity. In combination with the adaptation of the pitch angle described in claim 13, the landing load can in this way be equally distributed between at least two supporting points, in each case in front of and behind the centre of gravity, and thereby reduce the fuselage bending moments which occur when touching down.

Omitting the conventional undercarriage system gives rise to so-called snowball effects (smaller or reduced hydraulic system, less structural reinforcement due to the elimination of the braking bending moments of the conventional undercarriage, smaller keel beam or elimination thereof, continuous round fuselage segment in the area of the original main landing gear compartment, omission of the kink in the wing root area, smaller or no belly fairings, and others), which lead to a considerable reduction in the empty mass in addition to the saving in undercarriage system mass.

As well as reducing the mass, in some cases these effects have a considerable (positive) influence on the manufacturing and operational costs of the aircraft. Furthermore, the specific fuel consumption per payload and the $CO_2$ emissions are considerably reduced as well as the noise emission on the landing approach due to the absence of or smaller landing gear doors and the no longer protruding undercarriage. For the pilot, there are hardly any changes to the procedure for a normal landing. As claimed in claim 2, the procedure for landing in a side wind is simplified due to the rotational degree of freedom of the apparatus, as this enables the pilot to touch down with a wind correction angle without the usual detriment to comfort and safety for the passengers which is common in this case with a conventional undercarriage.

The thrust reverser can be dispensed with, as the aircraft is braked by the apparatus, as a result of which the engines are conserved, thus reducing the maintenance and procurement costs, and the noise and pollutant emissions at the airport are also reduced.

The installation of emergency systems on the aircraft (for example brake parachutes) has previously been dispensed with in most cases for weight reasons. As claimed in claim 15, such systems can be used in conjunction with the ground-based apparatus and contribute to increasing the active safety of aircraft on the ground. In the case of the utilization of braking energy as claimed in claim 7, the mass of the ground-based apparatus plays a subordinate role compared with the mass of aircraft. The systems required for controlling and transmitting energy to the apparatus are installed next to the runway so that there is no significant change to the existing nature of the runway and structure of the airport. This guarantees dual usability for conventional aircraft and aircraft without an undercarriage. Furthermore, installation and conversion work can be carried out during shutdowns. The runway does not have to be blocked for an extended period for this purpose.

BRIEF DESCRIPTION OF THE SEVERAL VIEWS OF THE DRAWINGS

Exemplary embodiments of the invention are described in more detail below and partly illustrated by means of diagrams.

DETAILED DESCRIPTION OF THE INVENTION

Figure 2:
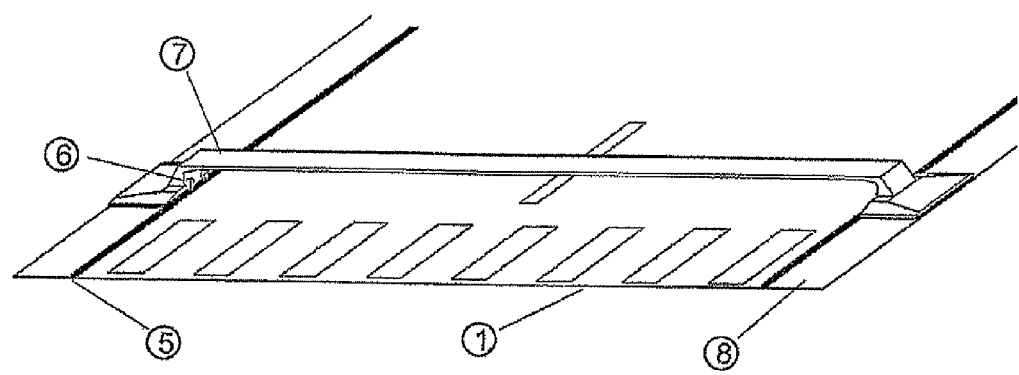
FIG. 2 shows the main component slide.
Figure 3:
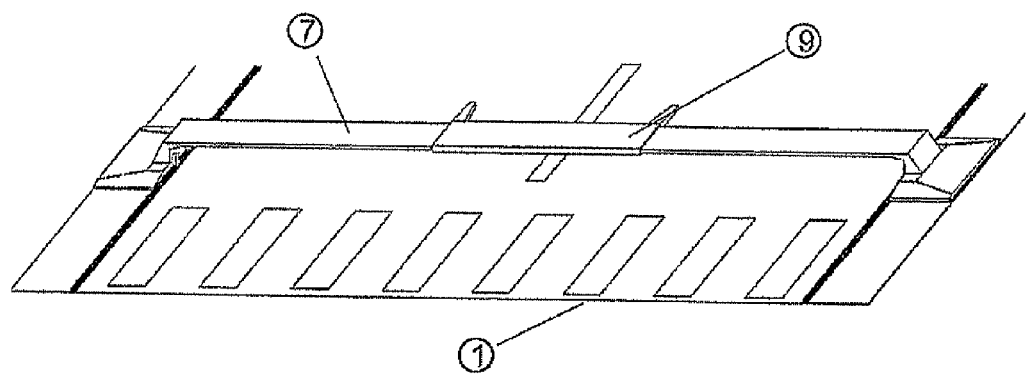
FIG. 3 shows the main component trolley.
Figure 4:
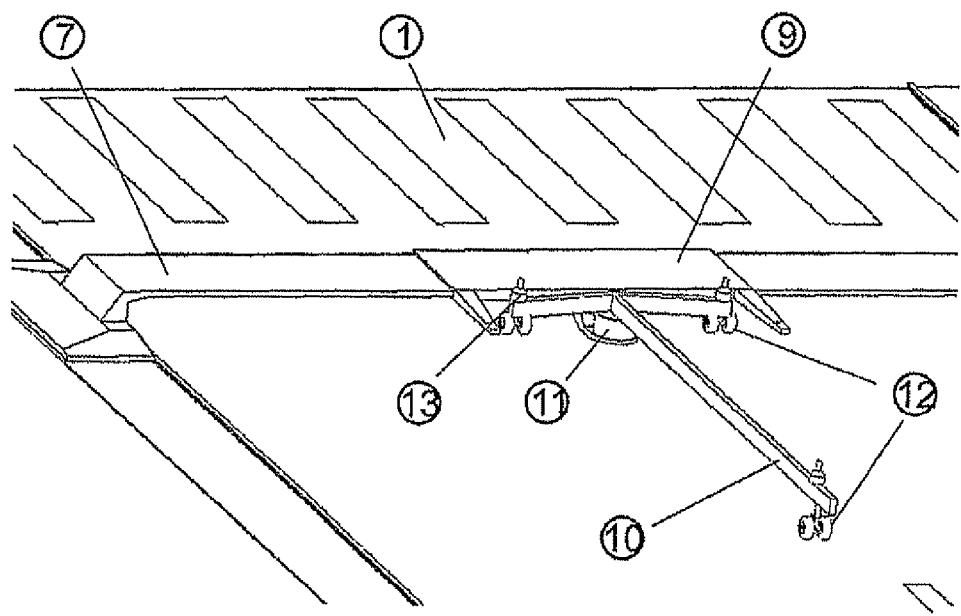
FIG. 4 shows the main component ground-based undercarriage.

While this invention may be embodied in many different forms, there are described in detail herein a specific preferred embodiment of the invention. This description is an exemplification of the principles of the invention and is not intended to limit the invention to the particular embodiment illustrated The invention consists of three main components: the slide 7 for the translatory degree of freedom along the runway, the trolley 9 for the translatory degree of freedom at right angles to the runway, and the ground-based undercarriage 10 for the rotational degree of freedom about the vertical axis which can be uncoupled for ground operations and of which several are provided at the airport. The slide 7 in FIG. 2 is guided along the runway 1 on a rail/wheel combination 5, 6, and is driven by a long stator linear motor 8 as claimed in claim 9. The trolley 9 in FIG. 3 is guided along the slide 7 (that is to say at right angles to the runway) and is driven either by a linear motor or actively steerable wheels 12. The combination of slide 7 and trolley 9 is described in the following as the slide system. The rotational degree of freedom of the ground-based undercarriage 10 in FIG. 4 is implemented by the so-called rotator 11 which is driven by two linear cylinders mounted between the rotator 11 and trolley 9.

The apparatus 3 is fitted with a shock absorber system which can be adapted to suit different masses and which can also be installed on the aircraft. The landing load factor can be reduced by extending the maximum shock strut travel compared with conventional undercarriage systems. In this way, it is possible to land an aircraft with maximum take-off mass in an emergency, possibly without the need to make modifications to the aircraft, instead of with the usually considerably lower maximum landing mass, as the forces of the landing impact, which are introduced into the aircraft, are reduced by the extended shock strut travel. A dumping of fuel with its ecological and economic consequences would then no longer be necessary.

When an aircraft 4 fitted with the appropriate interfaces is on a landing approach, the propulsion of the slide system is activated based on a redundant coupling of sensors on the ground (for example radar or laser sensors) and data communication of attitude and position information on the aircraft in conjunction with a controller, and adapts itself to the position and attitude of the approaching aircraft 4. The apparatus 3 is initially in front of the runway threshold 2 in the direction of flight (Position I in FIG. 1). As the approaching aircraft 4 comes closer, the apparatus 3 is accelerated in such a way that the speed difference between apparatus 3 and aircraft 4 is equal to zero no later than at the runway threshold 2 and the apparatus 3 is under the aircraft 4 in the direction of the gravitational acceleration force vector (Position II in FIG. 1). In conjunction with the respective drive, the two translatory degrees of freedom and the rotational degree of freedom about the vertical axis of the apparatus 3 ensure that the docking devices 13 of the ground-based undercarriage 10 are always located beneath the interfaces installed on the aircraft between the runway threshold 2 and the touch-down position. In this way, the pilot or autopilot can land as usual. When both funnel-shaped interfaces in the main undercarriage area of the aircraft as claimed in claim 16 are docked on the pin-like docking devices 13 of the ground-based undercarriage 10, bolts can be inserted in order to prevent lifting off once more without the use of spoilers.

Figure 1:
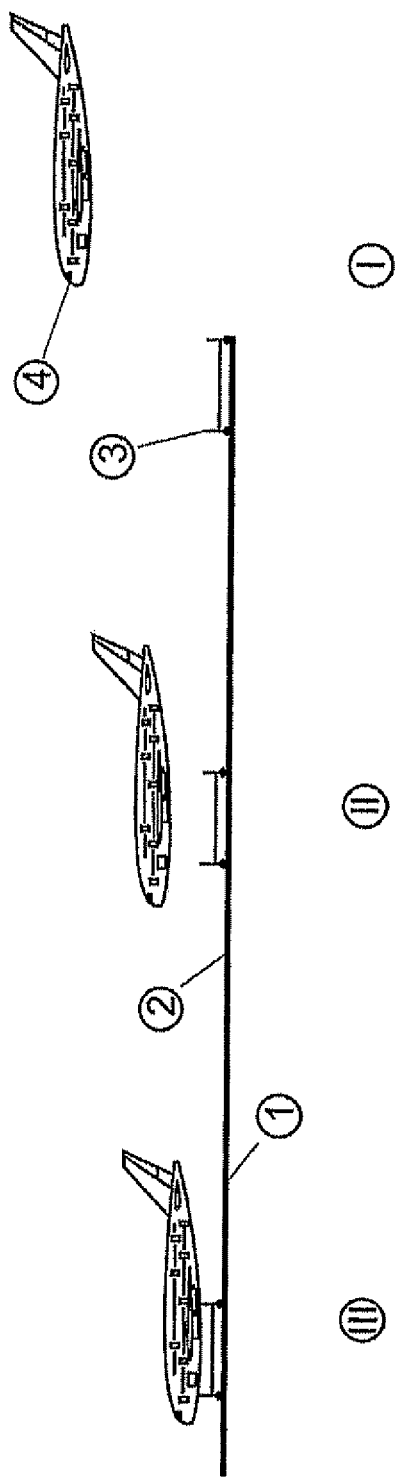
FIG. 1 shows a schematic representation of the landing with a ground-based apparatus for regular flight operations of aircraft without undercarriage system or with retracted undercarriage.

After the aircraft 4 has touched down and docked with the apparatus 3, this is braked so that the aircraft 4 comes to a standstill shortly before reaching an outgoing taxiway (or is reduced to a speed which is suitable for the taxiways) in order to be able to leave the runway 1 as quickly as possible (Position III in FIG. 1).

When the system is so equipped, the braking energy released during the braking process can be stored in a kind of gyroscope or be converted into usable heat by means of eddy currents in conjunction with heat exchangers. It is also conceivable to install the linear drive, which is described in claim 9, in such a way that the kinetic energy is converted into electrical energy, which, for example, can be stored or fed into the local electricity network.

In order to leave the runway 1 after braking, the ground-based undercarriage 10 (see FIG. 4) is decoupled from the trolley 9 (see FIG. 3) and remains beneath the aircraft 4. The aircraft 4 can taxi as usual. Several ground-based undercarriages 10 are provided at the particular airport to enable several aircraft 4 without undercarriage to be processed simultaneously.

The ground-based undercarriage 10 is fitted with its own drive which enables the main engines to be shut down shortly after landing until shortly before take-off This reduces the noise and pollutant emissions, particularly in the vicinity of the terminal, and also replaces the use of a push-back vehicle for pushing the aircraft back from the park position.

The apparatus 3 can actively support the acceleration of aircraft before take-off by means of the propulsion system 8. The energy stored during the braking process, for example, can be used for this purpose. This enables the aircraft to take off with reduced engine power, which conserves the engines and thus extends the maintenance intervals (consequently incurring lower maintenance costs). Noise and pollutant emissions at the airport are also reduced.

On take-off, the docking devices 13 are decoupled from the interfaces on the aircraft when the necessary speed is reached and the aircraft is able to lift off The pitch angle can be changed by the apparatus and therefore support lift-off of the aircraft. The size of control surfaces for which this maneuver is the determining factor can therefore be reduced.

For operational reasons, in some cases it may be expedient not to take the slide system back via the runway but to the side adjacent to it or to the side in a tunnel under any crossing taxiways.

In addition, it is pointed out that characteristics or steps which have been described with reference to one of the above exemplary embodiments can also be used in combination with other characteristics or steps of other exemplary embodiments described above.

This completes the description of the preferred and alternate embodiments of the invention. Those skilled in the art may recognize other equivalents to the specific embodiment described herein which equivalents are intended to be encompassed by the claims attached hereto.

REFERENCES

1 Runway
2 Runway threshold
3 Ground-based undercarriage apparatus
4 Aircraft without undercarriage with interfaces
5 Rail
6 Wheels
7 Slide
8 Slide propulsion
9 Trolley
10 Ground-based undercarriage
11 Rotator
12 Wheels
13 Docking device

The invention claimed is:

1. An apparatus for take-off, landing and taxiing of an aircraft without an undercarriage system or with retracted undercarriage, wherein the apparatus comprises:
   a ground-based undercarriage (10), the speed of which can be matched to the speed of the aircraft when landing,
   a slide system comprising a driven slide (7) including a trolley (9) to which a ground-based undercarriage (10) may be releasably connected;
   wherein
   the ground-based undercarriage (10) is releasably connected to the slide system, which can be driven in a direction of movement of the driven slide,
   the ground-based undercarriage (10) has at least two coupling means, which are configured to couple with the aircraft (4) on the ground-based undercarriage (10),
   the ground-based undercarriage (10) is configured to move along the slide system transversally to the direction of movement of the slide system to match the ground-based undercarriage (10) to the position of the aircraft (4) for coupling.

2. The apparatus as claimed in claim 1, wherein the ground-based undercarriage (10) can be adjusted about the vertical axis at an angle relative to the direction of movement of the slide system to match the ground-based undercarriage (10) to an angle of yaw of the aircraft (4) relative to the direction of movement of the slide system.

3. The apparatus as claimed in claim 1, wherein the slide system comprises a driven slide (7) and a trolley (9) which is releasably connected to the ground-based undercarriage (10) and can be moved along the slide (7).

4. The apparatus as claimed in claim 1, wherein the slide system and the ground-based undercarriage (10) has a braking system.

5. The apparatus as claimed in claim 1, wherein the slide system or the ground-based undercarriage (10) has a braking system that enables the braking force to be controlled so that the aircraft (4) which is connected to the ground-based undercarriage (10) comes to a standstill immediately by an outgoing taxiway from the runway (1).

6. The apparatus as claimed in claim 1, wherein the ground-based undercarriage (10) additionally has its own drive and systems which are necessary for taxiing without the use of the main engines of the aircraft (4) and replace a push-back vehicle.

7. The apparatus as claimed in claim 1, wherein the kinetic energy on braking is stored and transformed into usable heat or electrical energy.

8. The apparatus as claimed in claim 1, wherein the acceleration when aircraft (4) take off is supported by the drive (8) of the slide system.

9. The apparatus as claimed in claim 1, wherein the slide system is driven by an electromagnetic linear drive.

10. The apparatus as claimed in claim 1, wherein one or more damper elements are integrated into the slide system and the ground-based undercarriage (10).

11. The apparatus as claimed in claim 1, wherein one or more damper elements are integrated into the aircraft (4).

12. The apparatus as claimed in claim 10, wherein the damper elements can be adapted to different aircraft masses.

13. The apparatus as claimed in claim 1, wherein the angle of pitch of the aircraft (4) can be changed, particularly on take-off and landing.

14. The apparatus as claimed in claim 1, wherein the slide or slides (7) are not taken back to the ready-to-land and take-off position via the runway (1).

15. The apparatus as claimed in claim 1, wherein the slide system and the ground-based undercarriage (10) additionally has emergency systems with which the braking force can be increased.

16. The apparatus as claimed in claim 1, wherein the coupling means (13) of the ground-based undercarriage consist of protruding pin-like docking devices and the non-protruding interfaces on the aircraft are designed in the form of funnels.

17. The apparatus as claimed in claim 1, wherein the ground-based undercarriage (10) has a braking system.

18. The apparatus as claimed in claim 1, wherein the kinetic energy on braking is transformed into usable heat or electrical energy.

19. The apparatus as claimed in claim 1, wherein one or more damper elements are integrated into the ground-based undercarriage (10).

20. The apparatus as claimed in claim 1, wherein the slide or slides (7) are not taken back to the ready-to-land or take-off position via the runway (1).

\* \* \* \* \*